United States Patent [19]

Frystak et al.

[11] Patent Number: 4,984,008
[45] Date of Patent: Jan. 8, 1991

[54] FILM NUMBER WRITING SYSTEM

[75] Inventors: Richard Frystak, Park Ridge; John S. O'Callaghan, Sr., Wilmette, both of Ill.

[73] Assignee: Bell & Howell Company, Skokie, Ill.

[21] Appl. No.: 344,996

[22] Filed: Apr. 28, 1989

[51] Int. Cl.$^5$ .............................................. G03B 27/52
[52] U.S. Cl. ........................................ 355/24; 355/40; 355/51; 355/43
[58] Field of Search .................. 355/43, 40, 41, 54, 355/64, 24, 51, 60, 244

[56] References Cited

U.S. PATENT DOCUMENTS 4,624,558 11/1986 Johnson ............................ 355/54 X
4,701,046 10/1987 Shiga ................................. 355/40 X Primary Examiner—L. T. Hix
Assistant Examiner—D. Rutledge
Attorney, Agent, or Firm—Neuman, Williams, Anderson & Olson

[57] ABSTRACT

A writing system is usable in apparatus in which mirrors in a "V" configuration, split mirrors, a combining mirror and a camera mirror project images of opposite sides of a document in an imaging region to a microfilm in side-by-side relation. The writing system includes mirrors which project alpha or numeric character images from an LED display to the combining mirror to be projected to an otherwise unused portion of the microfilm. A compact folded path is provided having the same focal distance as that provided by the document image projecting mirrors.

19 Claims, 2 Drawing Sheets

FILM NUMBER WRITING SYSTEM

BACKGROUND OF THE INVENTION

1. Field of the Invention

This invention relates to a film number writing system and more particularly to a system for use in microfilm systems or the like. The system is operable during the recording of an image of a document on film to simultaneously record numbers and/or other indicia on the film which may relate to the document. It is usable during the simultaneous recording of images of both sides of a document, provides accurate and clear recording of indica and is readily controlled.

2. Background of the Prior Art

Prior art film writing systems have been used to identify documents which have been transferred to microfilm. Alpha or numeric characters are photographed by a microfilm camera and placed alongside microfilm photographs to make document identification easier.

In prior art microfilm identification systems, an identification code made of generated alpha or numeric characters is directed to the lens of a microfilm camera through the use of a relay lens. Typically, a liquid crystal display is used to generate the identification code. When characters are generated on the liquid crystal display, some segments of the display are turned on and others are turned off. On one side of the display sits a light which illuminates the backside of the display. Since turned-on segments of the liquid crystal display are opaque to the light and turned-off segments allow light to pass through, a visible image is created which can then be photographed. This image is directed and focused by a relay lens to the lens of a microfilm camera. The relay lens must be positioned accurately within such a microfilm identification system to insure proper focusing of the LCD image and to insure the image is directed to the proper location on the microfilm.

SUMMARY OF THE INVENTION

The present invention provides a film number writing system which has a simple design and is effective in operation. It particularly relates to a film number writing system for use in microfilming systems. Alpha and/or numeric characters can be exposed on the microfilm so that microfilmed documents can be easily identified. This system can be used to identify documents which have information on either one or both sides of the document.

In the microfilming system of the invention, documents are photographed a portion at a time, instead of photographing the entire document at once. This is accomplished by moving the microfilm past the lens of a microfilm camera at a speed which is directly proportional to the speed at which the document moves between transport rollers as it travels through the microfilming machine. This sequential photographing technique of the microfilming system is effectively used to write a string of identifying characters which are placed on the microfilm by the present invention.

The film number writing system writes characters on the film one vertical line at a time. A single character is composed by generating a series of vertical lines one element wide, that when placed side by side, add up to create a single character. As the microfilm is moved through the camera, an LED display generates one single vertical line of a character at a time.

In the preferred embodiment, the single vertical line is one element wide and seven elements high. Each one of the seven elements is either turned on or off in a certain pattern to generate a single vertical slice of the desired character.

Once the first slice or single line of a character has been generated, it is photographed. Then a new vertical slice of a character is generated. The film and the document are advanced, and that portion of the character is photographed. Since the film is continually advancing through the camera at a predetermined rate, the single vertical lines are effectively placed side by side on the film. Once a sufficient number of lines are filmed, a complete character is created. In this way, a string of characters is formed to create an identification code.

The illuminated characters generated by the LED array are directed to a microfilm camera by a series of mirrors. The present invention does not need a relay lens to focus and direct the image as seen previously in the prior art.

In this system, a steering mirror directs the character image to a facing mirror which in turn directs the image to a combining a mirror where the character image is combined with the document images. The location of the steering mirror is established so that the track length of the directed beam is the same length as in the normal document imaging system. Consequently, a perfectly focused character is delivered to the camera lens without the need for an intermediate relay lens.

For a more complete understanding of the invention, reference should now be made to the embodiments illustrated in greater detail in the accompanying drawings and described below by way of example.

It should be understood that the drawings are not necessarily to scale and that an embodiment is sometimes illustrated in part by phantom lines and fragmentary views. In certain instances, details of the actual structure which are not necessary for the understanding of the present invention may have been omitted. It should be understood, of course, that the invention is not necessarily limited to the particular embodiments illustrated herein.

DESCRIPTION OF A PREFERRED EMBODIMENT

Figure 1:
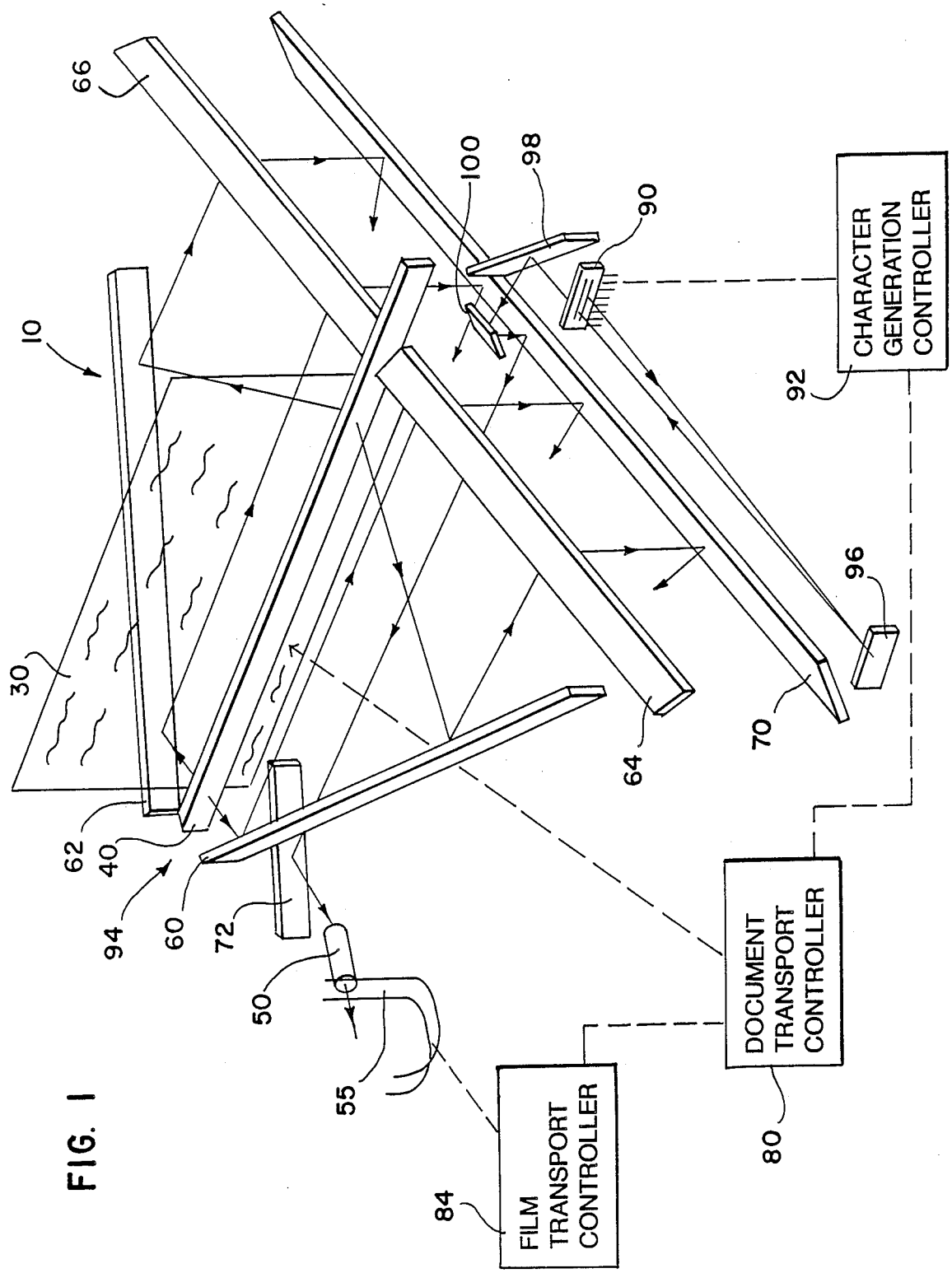
FIG. 1 is a perspective diagramatic view of the film number writing system and document imaging system of the present invention.
Figure 2:
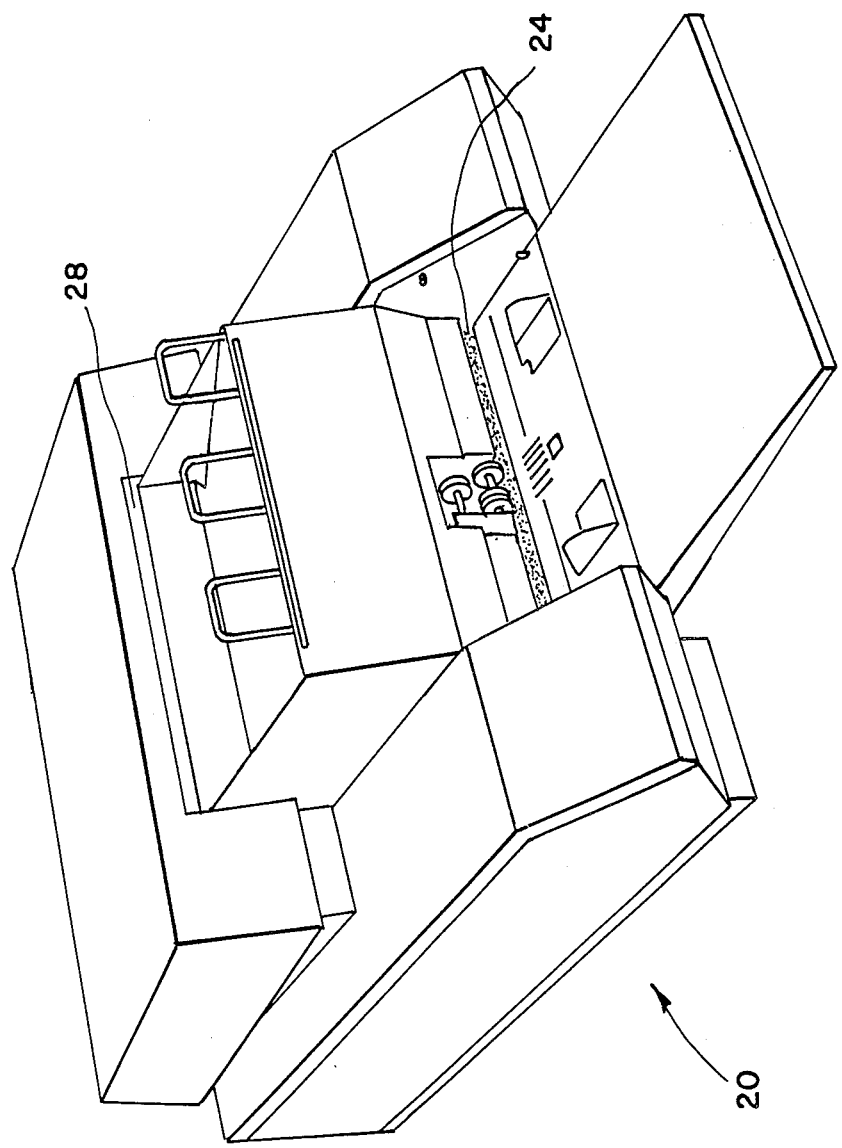
FIG. 2 is a perspective view of a microfilming system in which the present invention is used.
Figure 3:
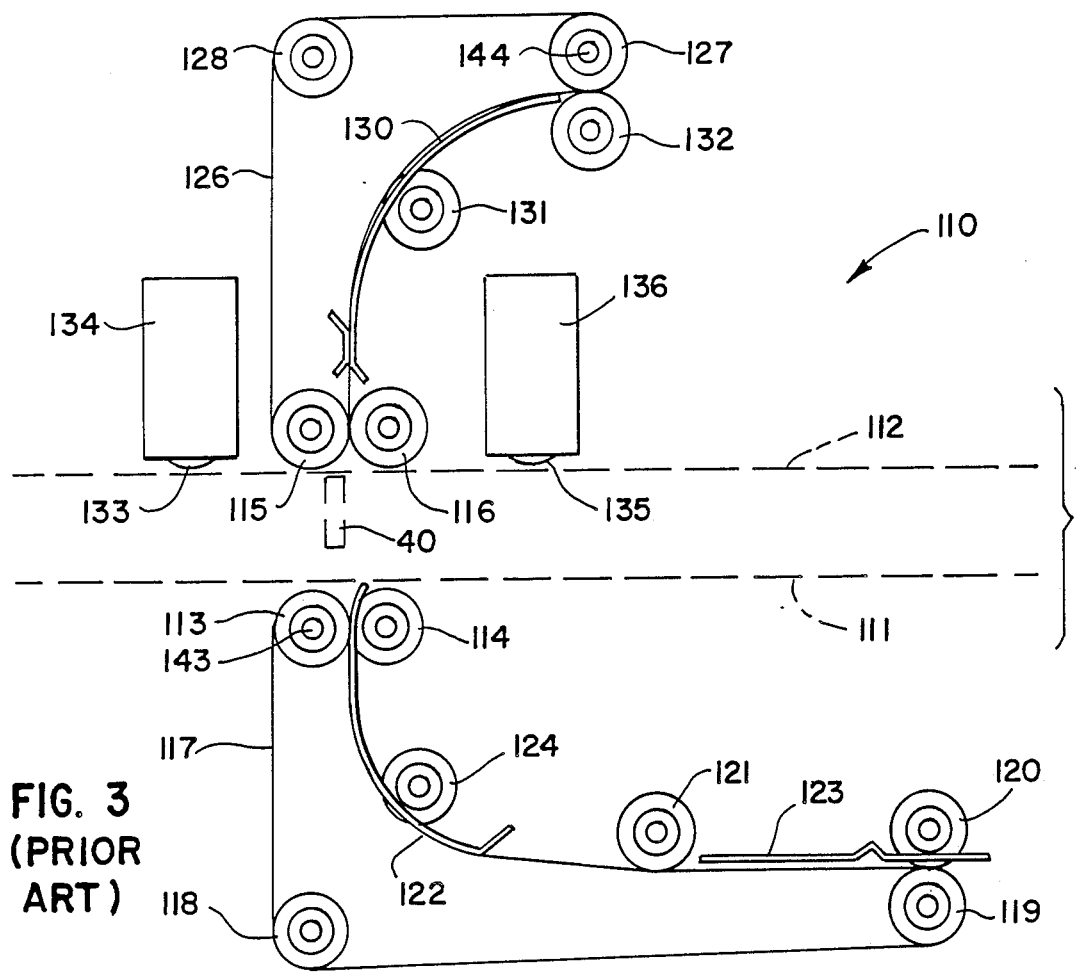
Figure 4:
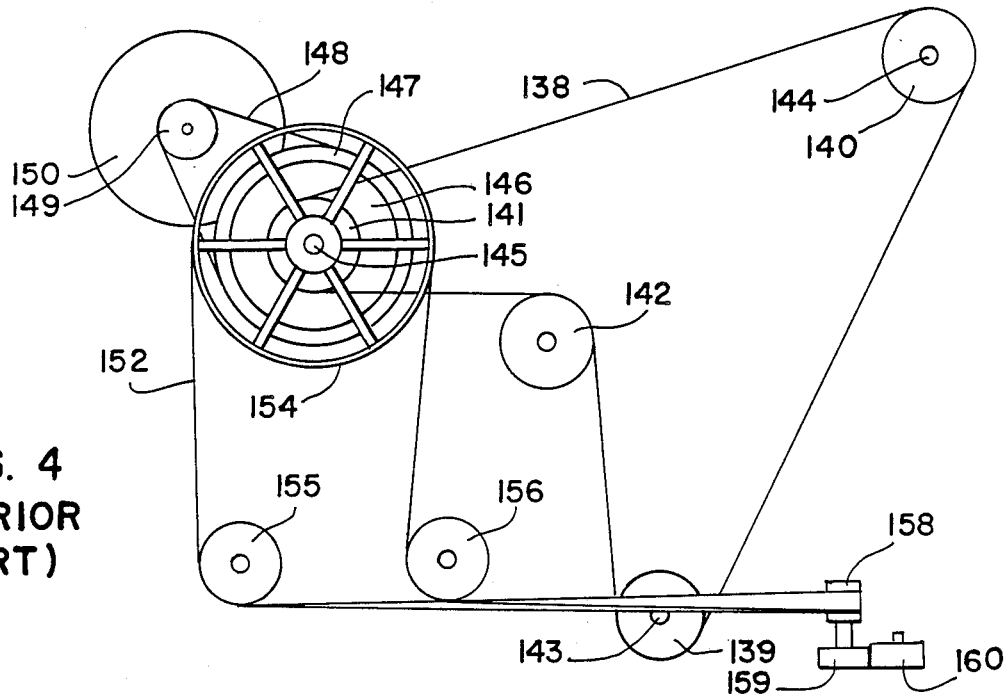

Referring now to FIG. 1, a film number writing system 10 for exposing alpha and/or numeric characters on microfilm to identify microfilmed documents is shown. The film number writing system includes an optical system including a microfilm camera lens and a number of front surface mirrors, a glass flat, an LED display, a film advance controller, a document advance controller, and a character generator controller. This film number writing system 10 is enclosed within a microfilming system 20 as seen in FIG. 2. Microfilming system 20 of FIG. 2 includes a document input opening 24 and a document output opening 28.

During the operation of microfilming system 20, documents are inserted through document input opening 24. Once documents have been fed a predetermined distance through document input opening 24, the document is then pulled into the machine by a set of document uptake rollers (not shown). After a document has been completely pulled to within the microfilming system 20, the process of microfilming and film number writing of the document begins.

To begin microfilming a document 30, it is pulled vertically upward and held taut by two sets of rollers (not shown), one set of rollers above and one set of rollers below a glass flat 40, as the document passes by glass flat 40. The glass flat 40 provides an imaging region which allows both sides of a document to be photographed at once, or alternatively only one side to be photographed if so desired as in the case of documents having information contained on only one side of the document. When the document 30 is being photographed, images of both sides of the document are reflected through a series of mirrors to a lens 50 of a microfilm camera, thereby exposing the image on a microfilm 55 which is disposed in an exposure region at the focal plane of the lens 50.

For copying of both sides of a document, two mirrors 60 and 62 are provided which are positioned to form a "V" and which are referred to herein as "V" mirrors. The front side or first side of the document 30 appears opposite the first or front "V" mirror 60. At the same time, the back side or second side of document 30 appears opposite the second or rear "V" mirror 62. These images are then reflected to a pair of mirrors 64 and 66 which are disposed in alignment in end-to-end relation with a separation or split therebetween, such mirrors being referred to hereinafter as split mirrors.

The front side image of document 30 is reflected to the front split mirror 64 while the back side image of document 30 is reflected to the rear split mirror 66. As seen in FIG. 1, the image path of the document's reflections are shown by image path direction lines which have arrows indicating the direction the image path takes as it leaves the document imaging region which is provided at the glass flat 40. Image path direction lines are shown for opposite ends of the document to show how the image of each side of the document 30 reverses itself when it passes from the original source document 30 to its corresponding split mirror.

Front split mirror 64 and rear split mirror 66 are positioned at a 45 degree angle with respect to vertical. This 45 degree angle allows the document image to be directed downward to a combining mirror 70. By following the image path direction arrows, the downward direction of the image path can be seen. The combining mirror combines both sides of the document onto one mirror. The entire image is then directed to a camera mirror 72. The complete image of both sides of the document has, at this point, been directed to a point in front of the lens 50 of the microfilm camera. The lens 50 then directs a microfilm size image to expose the image on microfilm 55.

The document 30 is photographed continuously, a portion at a time, by advancing the microfilm 55 past the lens 50 at a rate commensurate with the rate the document 30 passes the glass flat 40. A document transport controller 80 advances the document at a specified rate past the glass flat 40. At the same time, a film transport controller 84 advances the film at a rate proportional to the rate the document is travelling. For example, if a 44:1 reduction ratio of document size to film image size is desired, the film is advanced at 1/44th of the document transport rate by film transport controller 84.

The present invention, the film number writing system 10, utilizes this continuous microfilming process to generate alpha or numeric characters on the microfilm to provide microfilm document identification. Film number writing is accomplished by using a 1×7 LED dot matrix array 90, as seen in FIG. 1.

In the illustrated system, the LED array 90 is controlled by a character generation controller 92 to sequentially generate character segments each of which is 1 element wide by 7 elements high. Through the use of mirrors, an image of array 90 is placed in an otherwise unusable area of the film, the center of the dual side image area on the film, in the area where the glass flat 40 blocks imaging rays. This unusable area corresponds to a narrow end or apex 94 of the "V"-mirror assembly comprised of front "V" mirror 60 and back "V" mirror 62.

The 1×7 character segment which is displayed at any one time by the illustrated LED array 90 is positioned between the two document sides by a set of three mirrors and is so oriented as to be extend in transverse relation to the direction of movement of the document and film. A conventional alpha or numeric character is produced in any desired orientation by generating a series of such 1×7 character segments, using a technique similar to that used in printing with conventional dot matrix printer. It will be understood that in place of the illustrated LED dot maxtix array 90, a LED array or the equivalent may be used which displays a multiple number of elements in each direction to provide a grid pattern, with the rate of operation being controlled in relation to the speed of movement of the document to place characters formed by a series of such patterns along the character portion of the film.

When the LED array 90 is activated to display a character image, a steering mirror 96 receives the character image and directs that image to a turning mirror 98 which is positioned such that it can direct the image to a facing mirror 100. The steering mirror 96 is adjusted to fold the LED image back on itself and thus give a track length the same as the length of the document imaging system, thereby creating a properly focused character image. Facing mirror 100 is positioned directly above and in the center of combining mirror 70. The image received by facing mirror 100 is therefore directed to the otherwise unusable area of the film, the space which exists between opposite sides of the document. The combining mirror 70 has now combined not only the two sides of document 30, but a 1×7 LED character segment has also been placed between the two images of the front and back sides of the document. This complete image is in turn, directed to camera mirror 72 and recorded on microfilm 55 by lens 50.

Character generation controller 92 generates alpha or numeric characters from one to seven elements high and in any combination or sequence. Since the microfilming system 20 photographs documents continuously, a slice at a time, the 1×7 LED dot matrix array 90 can write in an array of up to 7 dots high by an unspecified length. The LED array 90 is selectively turned on as the film 55 moves past the lens 50. Character generator 92 turns on the LED array 90 for a specified period of time. The turn-on time is calculated based on the speed at which the document 30 travels past the glass flat 40. After one vertical segment or slice of a character is photographed, the next vertical slice of a character is generated. This slice is placed on the film immediately adjacent to the previous slice. In this way, a single letter or a single numeral is written one vertical line at a time, each line being seven elements high. By stringing together a series of 1×7 matrices, single characters can be generated one after the next. This sequencing of characters creates a specific alpha/numeric code which can be used to identify documents stored on microfilm.

It is not necessary for the 1×7 array image to be in the center between a front side image and the back side image of a document. In the case where only one side of the document is photographed, the number will be next to the image of the side photographed.

Once the document 30 has been completely microfilmed, the document exits document output opening 28.

It will be understood that modifications and variations may be effected without departing from the spirit and scope of the novel concepts of the invention.

We claim:

1. A microfilming system, comprising: means for moving a document through an imaging region, means for simultaneously moving film through an exposure region, a display device for generating a character image, and optical means for projecting an image of one side of said document in said imaging region to a document portion of said exposure region and for projecting said character image of said display device to a character portion of said exposure region which is disposed along one side of said document portion of said exposure region, wherein said optical means comprises document image projecting means for projecting said image of said document portion, separate character image projecting means for projecting said character image, and image combining means for combining images projected by said document image projecting means and said separate character image projecting means and projecting a combined image to said exposure region.

2. A microfilming system as defined in claim 1, wherein said image combining means includes a combining mirror for receiving said separately projected document and character images and reflecting said combined image.

3. A microfilming system, comprising: means for moving a document through an imaging region, means for simultaneously moving film through an exposure region, a display device for generating a character image, and optical means for projecting an image of one side of said document in said imaging region to a document portion of said exposure region and for projecting said character image of said display device to a character portion of said exposure region which is disposed along one side of said document portion of said exposure region, wherein said imaging region includes a second document portion on the opposite side of the document, and said optical means includes means for projecting an image of said second document portion to said exposure region in spaced side-by-side relation to the image of the first document portion, and wherein said character image is projected to a portion of said exposure region between said images of said first and second document portions.

4. A microfilming system, comprising: means for moving a document through an imaging region, means for simultaneously moving film through an exposure region, a display device for generating a character image, and optical means for projecting an image of one side of said document in said imaging region to a document portion of said exposure region and for projecting said character image of said display device to a character portion of said exposure region which is disposed along one side of said document portion of said exposure region, wherein said optical means includes portions used only in projecting said character image and other portions used only in projecting said image of said document while providing substantially the same optical path distance to said exposure region.

5. A microfilming system as defined in claim 4, wherein said portions of said optical means which are used only in projecting said character image include mirror means defining a folded optical path to minimize space.

6. A microfilming system as defined in claim 5, including means for operating said display device in synchronism with the synchronized movement of said document film.

7. A microfilming system as defined in claim 4, wherein said optical means includes a single lens unit used in projecting both said character image and said image from said document portion.

8. A microfilming system, comprising: means for moving a document through an imaging region, means for simultaneously moving film through an exposure region, a display device for generating a character image, and optical means for projecting an image of one side of said document in said imaging region to a document portion of said exposure region and for projecting said character image of said display device to a character portion of said exposure region which is disposed along one side of said document portion of said exposure region, wherein said display device generates an 1×N dot matrix array of elements, N being on the order of 7 or more, for generating an image in an array of up to N elements in one direction by any desired length.

9. A microfilming system as defined in claim 3, wherein said optical means comprises includes an elongated glass flat positioned to engage said opposite side of a document in said imaging region and being disposed in transverse relation to the direction of document movement, said second document portion being projected through said glass flat.

10. A microfilming system as defined in claim 9, wherein the region of said glass flat corresponds to said portion of said exposure region between said images of said first and second document portions to which said character image is projected.

11. A microfilming system as defined in claim 9, wherein said optical means further includes a pair of "V" mirrors having reflecting surfaces which are opposite the opposite sides of said glass flat and which extend angularly away from a region adjacent one end of said glass flat to provide a V-shaped configuration.

12. A microfilming system as defined in claim 11, wherein said optical system further includes a pair of split mirrors and which are disposed in alignment in end-to-end relation with a split therebetween and which receive images projected from said "V" mirrors.

13. A microfilming system as defined in claim 12, wherein said optical system further includes a combining mirror disposed opposite said split mirrors to receive images from both of said split mirrors.

14. A microfilming system as defined in claim 13, wherein said optical system further includes character projection mirror means for projecting an image to a central portion of said combining mirror between portions thereof which receive images from said split mirrors.

15. A microfilming system as defined in claim 1, wherein said separate character image projecting means includes mirror means defining a folded optical path.

16. A microfilming system as defined in claim 15, wherein said mirror means of said character image projecting means include a steering mirror arranged to receive an image from said display device and to substantially reverse the direction of projection thereof.

17. A microfilming system as defined in claim 16, wherein said mirror means of said character image projecting means further include a turning mirror adjacent said display device arranged to effect an approximate right angle turn in the direction of projection of the character image.

18. A microfilming system as defined in claim 16, wherein said steering mirror is adjustable to obtain a track length which is substantially the same as the track length.

19. A microfilming system as defined in claim 2, wherein said separate character image projecting means includes mirror means defining a folded optical path and including a facing mirror projecting said character image to said combining mirror.

* * * * *